United States Patent
Chokkarapu et al.

(10) Patent No.: US 12,046,051 B2
(45) Date of Patent: Jul. 23, 2024

(54) METHOD FOR AUTONOMOUSLY PARKING A MOTOR VEHICLE

(71) Applicant: DUS Operating Inc., Auburn Hills, MI (US)

(72) Inventors: Anil Chokkarapu, Hanamkonda (IN); Jyothendra Varma Polisetty, Vijayawada (IN); Avinash Bojja, Nagpur (IN)

(73) Assignee: New Eagle, LLC, Ann Arbor, MI (US)

( * ) Notice: Subject to any disclaimer, the term of this patent is extended or adjusted under 35 U.S.C. 154(b) by 418 days.

(21) Appl. No.: 17/376,257

(22) Filed: Jul. 15, 2021

(65) Prior Publication Data

US 2023/0024353 A1 Jan. 26, 2023

(51) Int. Cl.
*G06V 20/58* (2022.01)
*G05D 1/00* (2024.01)
*G06N 3/02* (2006.01)

(52) U.S. Cl.
CPC ......... *G06V 20/586* (2022.01); *G05D 1/0088* (2013.01); *G05D 1/0246* (2013.01); *G06N 3/02* (2013.01)

(58) Field of Classification Search
CPC .... G06V 20/586; G06V 10/454; G06V 10/82; G05D 1/0088; G05D 1/0246; G05D 2201/0213; G06N 3/02; G06N 3/0895; G06N 3/09; G06N 3/0464; G06N 3/084; B62D 15/0285
See application file for complete search history.

(56) References Cited

U.S. PATENT DOCUMENTS

2020/0090516 A1* 3/2020 Sert .................... G08G 1/141
2022/0198928 A1* 6/2022 Liu ...................... G06T 7/73

* cited by examiner

*Primary Examiner* — Jianxun Yang
(74) *Attorney, Agent, or Firm* — Vivacqua Crane, PLLC

(57) ABSTRACT

A system is provided that includes a computer including a processor and a memory. The memory includes instructions such that the processor is programmed to: receive an image depicting a parking spot, determine a length of the parking spot based on a classified endpoint of the parking spot, compare the length to an average length, and determine an endpoint of the parking spot when the length is less than the average length, wherein the determined endpoint is distal to the classified endpoint.

20 Claims, 8 Drawing Sheets

METHOD FOR AUTONOMOUSLY PARKING A MOTOR VEHICLE

FIELD

The disclosure relates generally to autonomous driver assistance systems for motor vehicles, and more particularly to autonomous driver assistance systems for parking a motor vehicle.

BACKGROUND

The statements in this section merely provide background information related to the present disclosure and may or may not constitute prior art.

Smart car technologies such as free-ranging on grid navigation, as well as parking guidance and information systems, aid in the prevention of human error when drivers operate a vehicle. Such technologies have been used to improve navigation of roadways, and to augment the parking abilities of motor vehicle drivers while the drivers are present within the motor vehicle. For example, rear view camera systems and impact alert systems have been developed to assist the operator of the motor vehicle while parking to avoid collisions. In addition, autonomous parking systems have been developed that autonomously park the motor vehicle in a parallel parking spot once the operator of the motor vehicle has positioned the motor vehicle in a predefined location proximate the parking spot.

While these systems are useful for their intended purpose, they require that the operator of the motor vehicle locate the parking spot and drive to the parking spot. Thus, there is a need in the art for improved smart car technologies that utilize preexisting infrastructure to autonomously park a motor vehicle. Moreover, there is a need to implement automatic parking systems in motor vehicles that do not increase cost, and which also increase the accuracy and robustness of parking systems.

SUMMARY

A system is provided that includes a computer including a processor and a memory. The memory includes instructions such that the processor is programmed to: receive an image depicting a parking spot, determine a length of the parking spot based on a classified endpoint of the parking spot, compare the length to an average length, and determine an endpoint of the parking spot when the length is less than the average length, wherein the determined endpoint is distal to the classified endpoint.

In other aspects, the processor is further programmed to actuate a vehicle system of a vehicle using the determined endpoint and the classified endpoint.

In other aspects, the processor is further programmed to classify the classified endpoint via a convolutional neural network.

In other aspects, the convolutional neural network comprises at least one of a single shot detector, a You-Only-Look-Once network, or a Fast-RCNN network.

In other aspects, the system includes a sensor configured to capture images representative of a vehicle environment.

In other aspects, the sensor is configured to capture Red-Green-Blue (RGB) images.

In other aspects, the classified endpoint and the determined endpoint comprise an x-coordinate and a y-coordinate within the image.

In other features, the image comprises a stitched image.

In other features, the processor is further programmed to stitch the stitched image based on a plurality of Red-Green-Blue images received from a plurality of sensors.

A method is provided that includes receiving an image depicting a parking spot, determining a length of the parking spot based on a classified endpoint of the parking spot, comparing the length to an average length, determining an endpoint of the parking spot when the length is less than the average length, wherein the determined endpoint is distal to the classified endpoint, and realigning the determined endpoint with an endpoint of an adjacent parking spot such that the parking spot is oriented with the adjacent parking spot.

In other aspects, the method includes actuating a vehicle system of a vehicle using the determined endpoint and the classified endpoint.

In other aspects, the classified endpoint is classified via a convolutional neural network.

In other aspects, the convolutional neural network comprises at least one of a single shot detector, a You-Only-Look-Once network, or a Fast-RCNN network.

In other aspects, the image is captured by a sensor configured to capture images representative of a vehicle environment.

In other aspects, the sensor is configured to capture Red-Green-Blue (RGB) images.

In other aspects, the classified endpoint and the determined endpoint comprise an x-coordinate and a y-coordinate within the image.

In other features, the image comprises a stitched image.

In other features, the method includes stitching the stitched image based on a plurality of Red-Green-Blue images received from a plurality of sensors.

A system is disclosed that includes a computer including a processor and a memory. The memory includes instructions such that the processor is programmed to: receive a stitched image depicting a parking spot, the stitched image based on a plurality of images captured by a plurality of sensors, determine a length of the parking spot based on a classified endpoint of the parking spot, compare the length to an average length, determine an endpoint of the parking spot when the length is less than the average length, wherein the endpoint is distal to the endpoint, realign the determined endpoint with an endpoint of an adjacent parking spot such that the parking spot is oriented with the adjacent parking spot, and actuate a vehicle system of a vehicle using the endpoint and the classified endpoint.

In other aspects, the classified endpoint is classified via a convolutional neural network.

Further aspects, examples, and advantages will become apparent by reference to the following description and appended drawings wherein like reference numbers refer to the same component, element or feature.

BRIEF DESCRIPTION OF THE DRAWINGS

The drawings described herein are for illustration purposes only and are not intended to limit the scope of the present disclosure in any way. The components in the figures are not necessarily to scale, emphasis instead being placed upon illustrating the principles of the disclosure. Moreover, in the figures, like reference numerals designate corresponding parts throughout the views.

DETAILED DESCRIPTION

The following description is merely exemplary in nature and is not intended to limit the present disclosure, application or uses.

Figure 1:
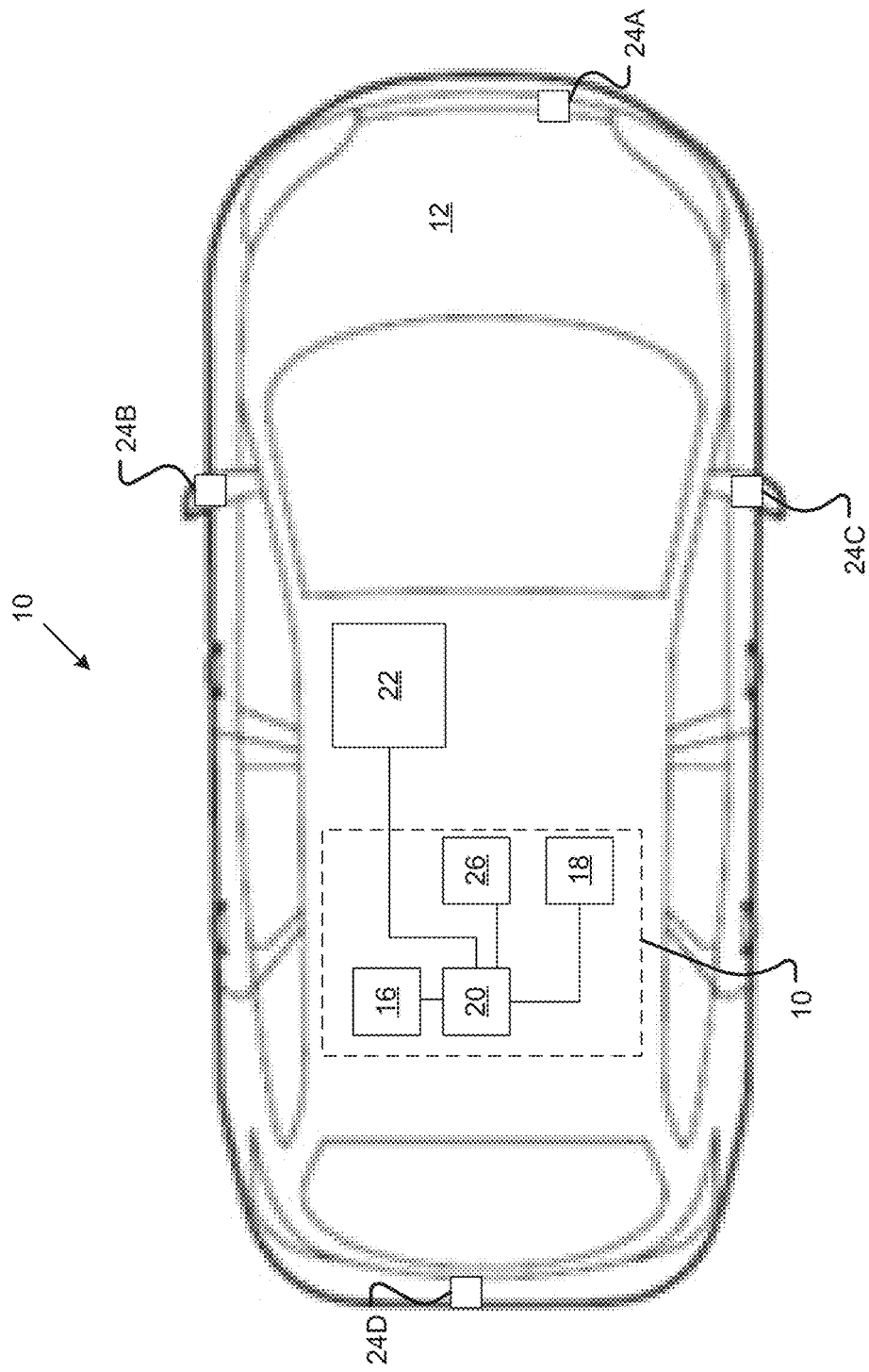
FIG. 1 is a schematic diagram of an exemplary motor vehicle having an autonomous park assisting system according to the principles of the present disclosure.

With reference to FIG. 1, an autonomous park assisting system according to the principles of the present disclosure is indicated by reference number 10. The autonomous park assisting system 10 is used with an exemplary motor vehicle 12 and an exemplary mobile device 14. The motor vehicle 12 is illustrated as a passenger vehicle, however, the motor vehicle 12 may be a truck, sport utility vehicle, van, motor home, or any other type of vehicle without departing from the scope of the present disclosure. The mobile device 14 is preferably a mobile phone, however, the mobile device 14 may be a mobile computer, laptop, tablet, smart watch, or any other device in wireless communication with the motor vehicle 12. The autonomous valet system 10 runs an autonomous valet method or application, as will be described in greater detail below.

The autonomous park assisting system 10 is operable to autonomously park and un-park the motor vehicle 12. The autonomous park assisting system 10 may have various configurations without departing from the scope of the present disclosure but generally includes a sensor sub-system 16 and a communication sub-system 18 each in communication with a controller 20. The controller 20 communicates with a vehicle control system 22. The sensor sub-system 16 includes a plurality of sensors 24A-D mounted along the periphery of the motor vehicle 12. In the example provided, the sensors 24A through 24D are located at the front, left, right, and rear of the motor vehicle 12, respectively, to provide 360 degrees of overlapping coverage. However, it should be appreciated that the sensor sub-system 16 may have any number of sensors 24 without departing from the scope of the disclosure. Each of the sensors 24A-D is operable to collect or sense information in a predefined area surrounding the motor vehicle 12. Information from the sensors 24A through 24D is communicated to the controller 20. In a preferred embodiment, the sensors 24A through 24D are cameras that collect images and/or video data. For example, the sensors 24A through 24D may be infra-red cameras, RGB cameras, dual (side-by-side) cameras, time-of-flight cameras, or log profile cameras.

The communication sub-system 18 includes a receiver/transmitter operable to receive and/or transmit wireless data to the mobile device 14. The wireless data is communicated to the controller 20. In addition, the communication sub-system 18 may communicate with other vehicles (vehicle-to-vehicle communication), infrastructure such as a parking lot (vehicle-to-infrastructure), and may receive Global Positioning System (GPS) data.

The controller 20 is a non-generalized, electronic control device having a preprogrammed digital computer or processor, memory or non-transitory computer readable medium used to store data such as control logic, instructions, image data, lookup tables, etc., and a plurality of input/output peripherals or ports. The processor is configured to execute the control logic or instructions. The controller 20 may have additional processors or additional integrated circuits in communication with the processor, such as perception logic circuits for analyzing the sensor data.

The controller 20 may optionally communicate with a human machine interface (HMI) 26. The HMI 26 is disposed within the cabin of the motor vehicle 12 and is preferably a touch screen accessible by an operator of the motor vehicle 12. However, the HMI 26 may be any haptic, verbal, or gesture control system without departing from the scope of the present disclosure. The HMI 26 may be used to activate and control the autonomous park assisting system 10. Additionally, the mobile device 14 may be used to activate and control the autonomous park assisting system 10.

The vehicle control system 22 includes any systems that implement the autonomous park assisting functions which include parking the motor vehicle 12. For example, the vehicle control system 22 may include a braking control system, throttle control system, steering control system, body control system, etc. The vehicle control system 22 may also include any advanced driver assistance system (ADAS) functions that automate, adapt, or enhance vehicle systems in order to increase vehicle safety and/or operator driving performance. For example, the vehicle control system 22 may include ADAS technologies that alert the driver to potential problems or to avoid collisions by implementing safeguards, such as autonomously controlling the motor vehicle 12. The vehicle control system 22 may also include ADAS features that enhance certain systems, such as automated lighting, adaptive cruise control, automated braking, or improved blind spot elimination using camera technology. Finally, it should be appreciated that the vehicle control system 22 may be part of the autonomous valet system 10 without departing from the scope of the present disclosure.

Figure 2:
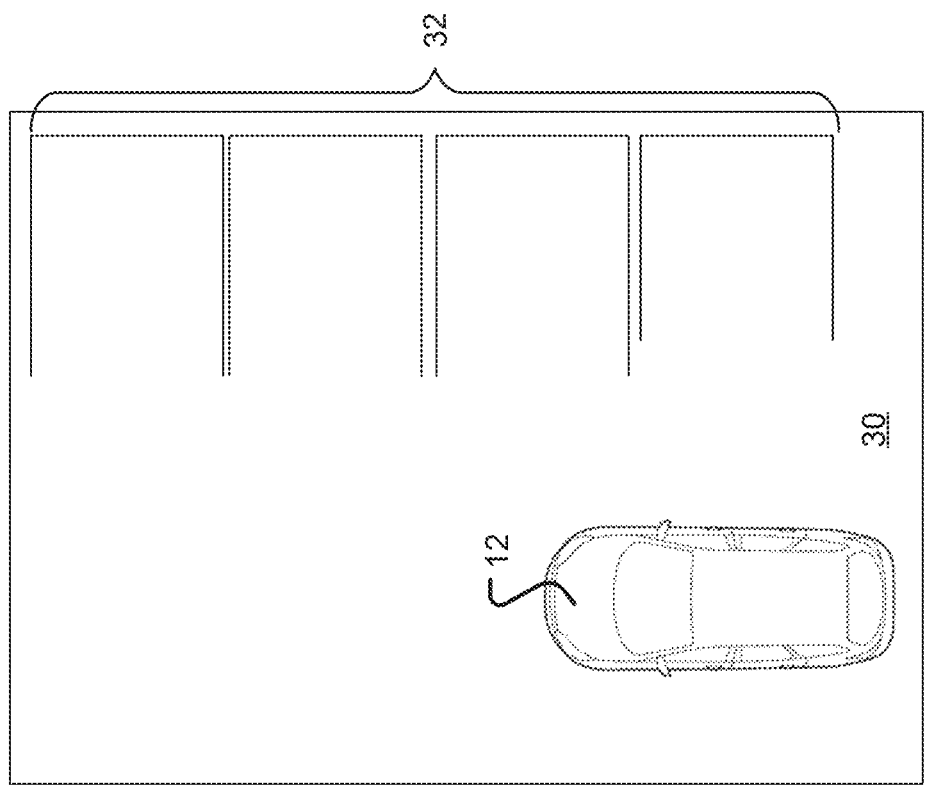
FIG. 2 is a schematic diagram of an exemplary parking area.

With reference to FIG. 2, an exemplary parking area is indicated by reference number 30. The parking area 30 includes a plurality of parking spots 32. It should be appreciated that the parking area 30 may have any configuration, may be a parking structure, and may have any number of parking spots 32 without departing from the scope of the present disclosure. Each parking spot 32 may be defined by corresponding parking spot markings 34. In an example embodiment, a parking spot 32A may be defined by a first parking spot marking 34A, a second parking spot marking 34B, and a third parking spot marking 34C. Each sensor 24A through 24D can capture images within a corresponding field-of-view (FOV) exterior to the vehicle 12 of the respective sensors 24A through 24D. As the vehicle 12 is traveling within the parking area 30, one or more sensors 24A through 24D may capture images including one or more markings 34 defining one or more parking spots 32. For example, the motor vehicle 12 may be located in the parking area 30 by positioning the motor vehicle 12 in a predefined starting location or parking spot or by GPS coordinates. At step 56 the motor vehicle 12 communicates with the parking area infrastructure to receive a map of the parking area 30. The map may be defined as a Cartesian coordinate system with x and y coordinates.

Figure 3:
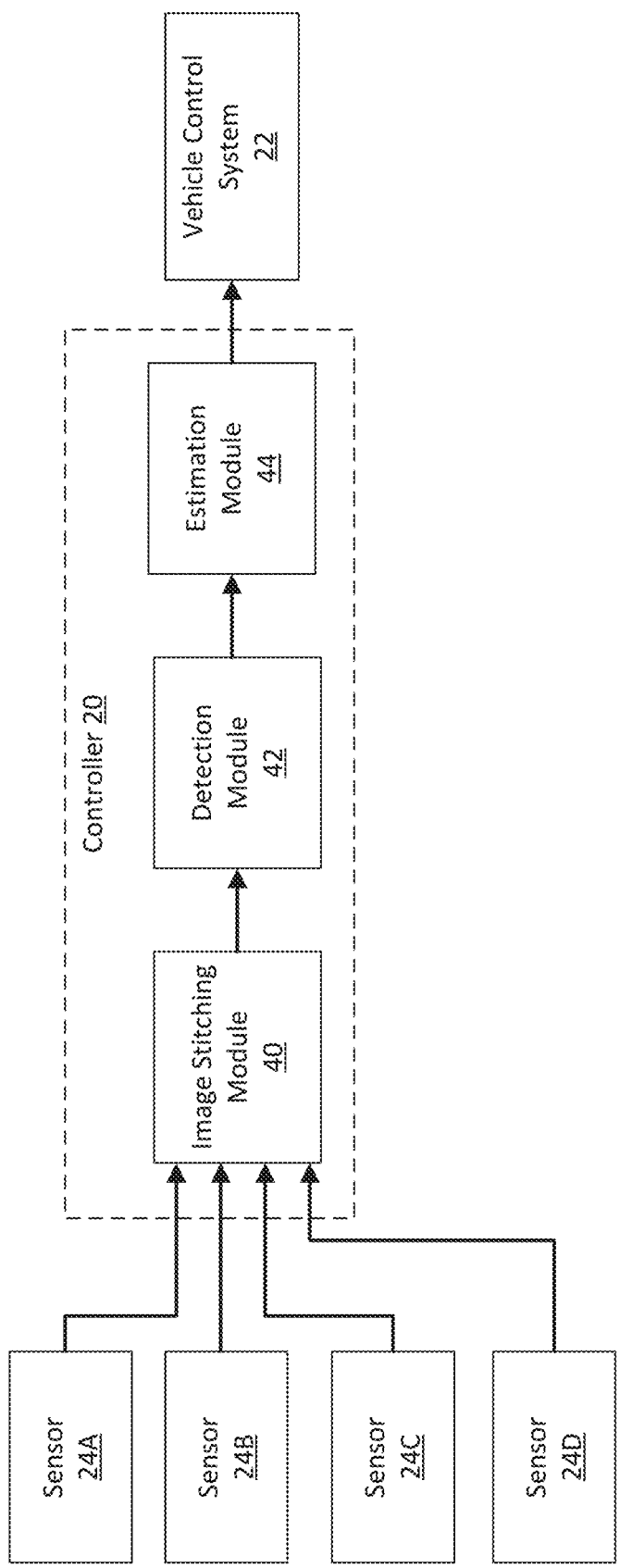
FIG. 3 is a block diagram of an example autonomous park assisting system.

With reference to FIG. 3, each sensor 24A through 24D provides respective images to an image stitching module 40. The image stitching module 40 can be executed by the controller 20. During operation, the sensor 24A provides an image having a first FOV exterior to the vehicle 12 to the image stitching module 40. In this example, the sensor 24B provides an image having a second FOV exterior to the vehicle 12 to the image stitching module 40. The sensor 24C and the sensor 24D also provide an image having a third FOV and a fourth FOV, respectively, exterior to the vehicle 12 to the image stitching module 40.

The image stitching module 40 receives images from each of the sensors 24A-D and generates a stitched image using the received images. The stitched image can depict objects captured from each of the sensors 24A through 24D in a single image. Stitched images may depict a panoramic view, which may be referred to as a surround view, a top view, or a bird's eye view. The image stitching module 40 can apply conventional image stitching processes to the received images to connect captured images to generate a single stitched image depicting a panoramic view around the vehicle 12.

Figure 5:
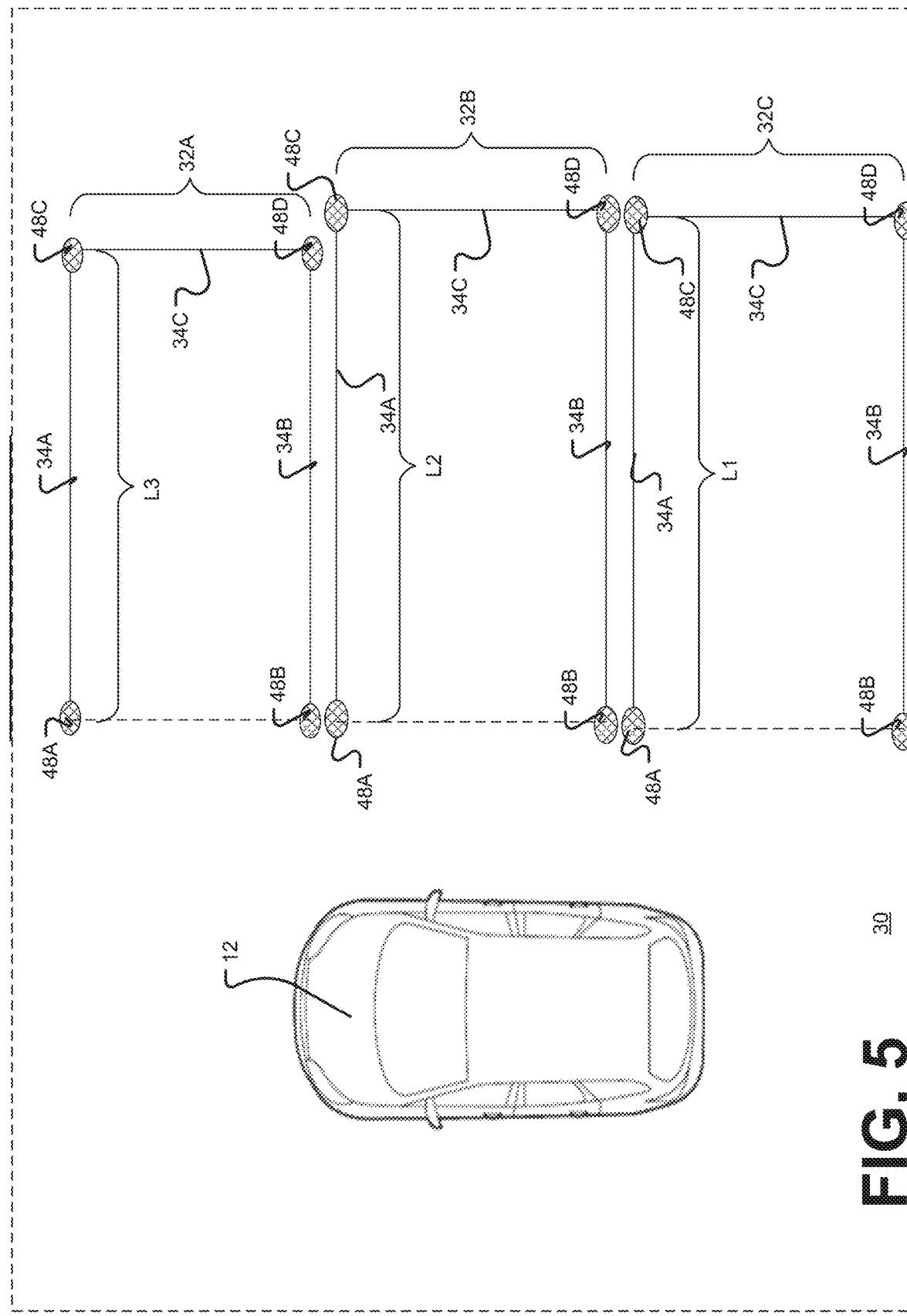
FIG. 5 is a schematic diagram of an exemplary parking area.

The image stitching module 40 outputs the generated stitched image to a detection module 42. The detection module 42 can be executed by the controller 20. The detection module 42 uses the stitched image to classify endpoints 48, such as endpoints 48A, 48B, 48C, 48D corresponding to one or more parking spots 32 as shown in FIG. 5. For example, the detection module 42 classifies endpoints 48 as an edge of the parking spot markings 34A, 34B. The detection module 42 can use a neural network, such as a convolutional neural network (CNN) 50 or any other suitable neural network, to classify endpoints 48 corresponding to the one or more parking spots using the parking spot markings 34. It is understood that the detection module 42 may also use suitable image processing techniques to classify endpoints 48 of the parking spots. The endpoints 48 can represent two-dimensional coordinates, e.g., x- and y-coordinates, within the stitched image representing edges of the parking spot markings 34A, 34B, 34C, 34D. Within a stitched image, an endpoint 48 of a parking spot marking 34 may be defined as a subset of pixels within the stitched image that represent non-parking spot markings that are adjacent to parking spot markings 34A, 34B, 34C, 34D. For example, the parking spot markings 34 may be determined when pixel hue, e.g., color, changes from one hue, e.g., white representing parking spot markings 34, to another hue, e.g., gray representing areas of the parking lot mot marked.

Figure 4:
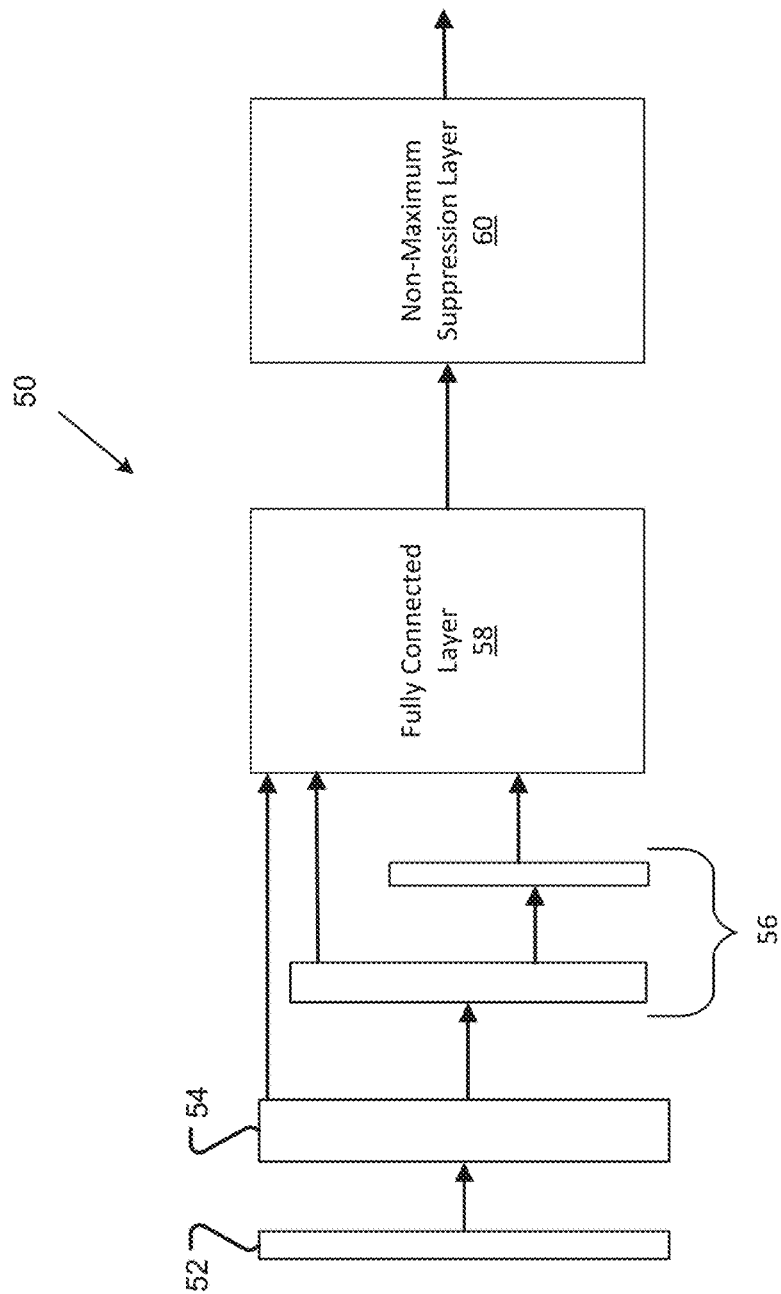
FIG. 4 is a block diagram of an example convolutional neural network for classifying endpoints of a parking spot within a parking area.

An example embodiment of the CNN 50 is illustrated in FIG. 4. The CNN 50 is configured as a single shot detector (SSD) in the example provided. However, the CNN 50 may be a You-Only-Look-Once (YOLO) network or a Fast-RCNN without departing from the scope of the present disclosure. The stitched image is communicated to the CNN 50 and is trained to predict endpoints 48 for parking spot markings 34 from the stitched image.

With reference to FIG. 4, the CNN 50 generally includes an input layer 54, a number of convolution and pooling layers (CPUs) 56, a fully connected layer 58, and a non-maximum suppression layer 60, each stacked together with each other. The input layer 54 loads the raw input data of the stitched image 52 to be processed by the CNN 50. The stitched image is usually defined by the image width, height, and the number of channels per pixel. In Red/Green/Blue (RGB) input images, the number of channels is three to hold the individual RGB values.

The CPUs 56 each contain convolution layers and pooling layers. Convolution layers detect the presence of specific features or patterns in the original data by applying a convolution operation between a filter (the weights of the network which have been previously trained, as described above) and the stitched image. These features and patterns are given a confidence vote and used to identify endpoints 48A, 48B representing an edge, e.g., a parking spot marking edge, of the parking spot markings 34A, 34B, respectively. The parking lot lane markings 34 are categorized to generate a number of feature maps. The first CPUs 56 learn to represent data in a very simple form such as horizontal and vertical lines and simple blobs of colors. The following CPUs 56 capture more complex shapes such as circles, rectangles, triangles, and the like. The subsequent layers of the CPUs 56 detect complex combinations of features from the previous layer or layers to form a more meaningful representation such as wheels, parking spot markings, faces, grids, and the like. The output of the convolution and activation layer for a given filter is a feature map. The pooling layers represent the process of reducing the spatial size of the stitched image. Examples include max pooling and average pooling. For example, if a resolution of the input image to a pooling layer is 640×540, then the resolution of the output image or feature map is 320×270. The outputs, including feature maps, from the input layer 54 and each CPL 56 are communicated to the fully connected layer 58.

The fully connected layer 58 receives the filtered images, i.e. the feature maps, from the input layer 54 and the fully connected layer 58 and translates these into votes or confidence levels for edges of the parking spot lane markings 34. The fully connected layer 58 generates multiple parking spot lane marking edge predictions, each having a confidence level associated with strength of the prediction.

The non-maximum suppression layer 60 receives the multiple lane bounding box predictions and generates multiple final parking spot lane marking edge predictions. The multiple final parking spot lane marking edge prediction can have an aggregate high confidence value, for example of between 98% and 100%, that the parking spot lane marking edges are properly classified and localized.

An estimation module 44 receives the output of the CNN 50 as input, and the estimation module 44 generates parking spot estimations using the output of the CNN 50. The estimation module 44 estimates a length L (shown as L1 through L3 for respective parking spots 32A through 32C) for each parking spot 32 based on corresponding endpoints 48. While described within the context of calculating a length of a parking spot, it is understood that techniques described herein can be applied to calculating a width for a parking spot.

As the vehicle 12 traverses parking area 30, the sensors 24A through 24D capture additional images of the surrounding environment. As the vehicle 12 approaches the parking spots 32A through 32C, the sensors 24A through 24D provide additional images to the detection module 42 to classify endpoints 48A through 48D for visible parking spots 32A through 32C.

As shown in FIG. 5, based on a relative vehicle 12 position within the parking area 30, the sensors 24A through 24D may capture images that only allow the detection module 42 to classify endpoints 48 for parking spot 32A that are proximal to the vehicle 12, e.g., endpoints 48A and 48B. The estimation module 44 can initially determine a valid parking spot for parking spot 32A based on length L1 and/or L2 of parking spots 32B, 32C. The estimation module 44 can determine the lengths L1 and/or L2 by estimating a distance between endpoints 48A and 48C of the corresponding parking spots 32B, 32C. The length L1 and/or L2 may correspond to a length of the parking spot marking 34A. In an example implementation, the estimation module 44 can estimate L1 and/or L2 by determining a ratio that calculates a number of pixels per given metric, e.g., inches, feet, meters, etc.

Based on a position of the vehicle 12 relative to the parking spot 32A since the estimation module 44 has not received endpoints 48C and 48D for parking spot 32A from the determination module 42. The estimation module 44 determines the distal pseudo endpoints by applying a predefined default length to endpoints 48A and 48B. A pseudo length, e.g., a length similar to L1 and/or L2, for parking spot 34A can be initially set to the predefined default length. In an example implementation, the predefined default length is preset by a vehicle manufacturer or a vehicle supplier. The estimation module 44 can then calculate a mean length "Lm" by determining an arithmetic mean for the lengths L1, L2, and the pseudo length according to equation 1:

$$Lm = (\text{sum of total number of lengths})/(\text{total number of lengths}) \qquad \text{Eqn. 1}$$

As the vehicle traverses the parking area 30, the determination module 42 can determine endpoints 48C and 48D using the techniques described above. Based on the determination, the determined endpoints 48C and 48D may differ from the distal pseudo endpoints calculated using the predefined default length. Using the determined endpoints 48C and 48D, the estimation module 44 can calculate length L3 based on the pixel coordinates of endpoints 34A, 34B, 34C, and/or 34D.

The estimation module 44 compares the length L3 to the mean length Lm to determine whether the length L3 is equal to the mean length Lm. If the length L3 is less than the mean length Lm, the estimation module 44 re-calculates the distal endpoints 48C and 48D as discussed in greater detail below.

The estimation module 44 can re-calculate the endpoints 48C and 48D by calculating vectors values using x- and y-coordinates for the endpoints 48C and 48D of parking spot 32A according to equations 2 and 3:

$$vec_x = x_{P1} - x_{P2} \qquad \text{Eqn. 2}$$

$$vec_y = y_{P1} - y_{P2} \qquad \text{Eqn. 3}$$

where $vec_x$ is a vector representing a difference between coordinate $x_{P1}$ and coordinate $x_{P2}$, $x_{P1}$ represents an x-coordinate value for endpoint 48A of parking spot 32C, $x_{P2}$ represents an x-coordinate value for endpoint 48B of parking spot 32A, $vec_y$ is a vector representing a difference between coordinate $y_{P1}$ and coordinate $y_{P2}$, $y_{P1}$ represents an y-coordinate value for endpoint 48A of parking spot 32A, and $y_{P2}$ represents an y-coordinate value for endpoint 48B of parking spot 32A.

The estimation module 44 can calculate a first and a second direction vector using $vec_x$ and $vec_y$ according to equations 4 and 5:

$$\text{dirVec}[1] = (vec_x * \cos\theta) + (vec_y * (-\sin\theta)) \qquad \text{Eqn. 4}$$

$$\text{dirVec}[2] = (vec_x * \sin\theta) + (vec_y * \cos\theta) \qquad \text{Eqn. 5}$$

where dirVec[1] is a first directional vector, dirVec[2] represents a second directional vector, and θ a value representing an angle measurement. In one or more implementations, the value of θ can be determined via a rotation matrix of one or more sensors 24A through 24D. The rotation matrix can represent an external parameter determined using a given known calibrator. The value of θ can change according to an orientation of the parking slot 32A.

For example, the value θ may be negative for a counter-clockwise orientation and may be positive for a clockwise orientation.

The estimation module 44 can calculate the coordinates for the distal endpoints 48C and 48D of parking spot 32A according to equations 6 through 9:

$$x_{P3} = x_{P2} + (\text{dirVec}[1] * Lm) \qquad \text{Eqn. 6}$$

$$y_{P3} = y_{P2} + (\text{dirVec}[2] * Lm) \qquad \text{Eqn. 7}$$

$$x_{P4} = x_{P1} + (\text{dirVec}[1] * Lm) \qquad \text{Eqn. 8}$$

$$y_{P4} = y_{P1} + (\text{dirVec}[2] * Lm) \qquad \text{Eqn. 9}$$

where $x_{P3}$ represents an x-coordinate value for endpoint 48C, $y_{P3}$ represents an y-coordinate value for endpoint 48C, $x_{P4}$ represents an x-coordinate value for endpoint 48D, and $y_{P4}$ represents an y-coordinate value for endpoint 48D.

In some implementations, the value of θ can be set to 90° for perpendicular and parallel parking spots, and the value of θ can be set to a standard angle value, i.e., 45°, 60°, etc., for slanted parking spots. After calculating the endpoints 48C and 48D, the length L3 for parking spot 32A is determined by calculating a difference between endpoints 48A and 48C or endpoints 48B and 48D, e.g., the difference between the x-coordinates and the difference between the y-coordinates for each endpoint.

Figure 6:
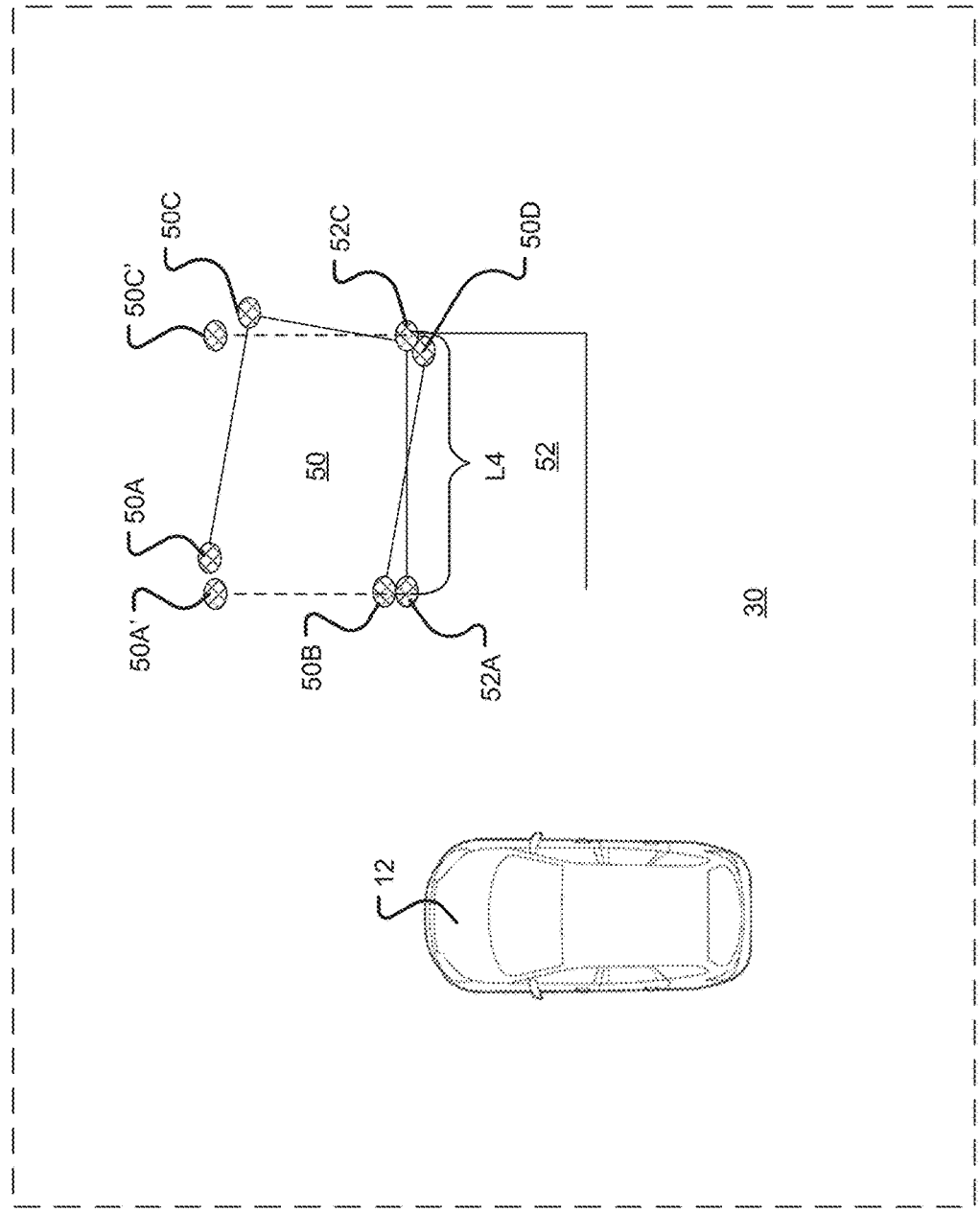
FIG. 6 a schematic diagram of another exemplary parking area.

Referring to FIG. 6, in some parking environments, the autonomous park assisting system 10 may not be able to estimate one or more parking spots within a parking area 30 due to improper parking spot markings. For example, as shown in FIG. 6, parking markings delineating parking spot 50 may not be parallel to an adjacent parking spot. In these situations, the autonomous park assisting system realigns the parking spot 50 such that the parking spot 50 is parallel to the adjacent parking spot.

The estimation module 44 determines whether two parking slots are adjacent to one another. Referring to FIG. 6 the estimation module 44 can determine whether parking spot 50 is adjacent to parking spot 52 calculating a y-axis difference d1 and d2 according to equations 10 and 11:

$$d_1 = y_{P1} - y_{Q1} \qquad \text{Eqn. 11}$$

$$d_2 = y_{P2} - y_{Q2} \qquad \text{Eqn. 12}$$

where $d_1$ represents a difference between $y_{P1}$ and $y_{Q1}$, where $d_2$ represents a difference between $y_{P2}$ and $y_{Q2}$, $y_{P1}$ represents a y-coordinate value for endpoint 52A, $y_{Q1}$ represents a y-coordinate value for endpoint 50B, $y_{P2}$ represents a y-coordinate value for endpoint 52C, and $y_{Q2}$ represents a y-coordinate value for endpoint 50D.

The y-axis difference can be calculated by determining a difference between $d_1$ and $d_2$. If the difference is less than a predetermined distance threshold, the estimation module 44 determines the parking spots 50 and 52 are adjacent. The coordinates for endpoints 50B and 50D are set equal to coordinates for endpoints 52A and 52C.

The estimation module 44 determines a length L4 using endpoints 52A and 52C according to equation 13:

$$L4 = \sqrt{(x_{P2} - x_{P1})^2 + (y_{P2} - y_{P1})^2} \qquad \text{Eqn. 13}$$

where $x_{P1}$ represents an x-coordinate for endpoint 52A, $x_{P2}$ represents an x-coordinate for endpoint 52C, $y_{P2}$ represents a y-coordinate for endpoint 52A, and $y_{P1}$, represents a y-coordinate for endpoint 52C.

Similar to the process described above with respect to Equations 2 through 5, the estimation module 44 calculates endpoints 48C and 48D by calculating vectors values using x- and y-coordinates for the endpoints 48C and 48D according to Equations 14 and 15 and calculating a first and a second direction vector using $vec_x$ and $vec_y$ according to equations 16 and 17:

$$vec_x = x_{P1} - x_{P2} \qquad \text{Eqn. 14}$$

$$vec_y = y_{P1} - y_{P2} \qquad \text{Eqn. 15}$$

$$dirVec[1] = (vec_x * \cos\theta) + (vec_y * (-\sin\theta)) \qquad \text{Eqn. 16}$$

$$dirVec[2] = (vec_x * \sin\theta) + (vec_y * \cos\theta) \qquad \text{Eqn. 17}$$

Using the values calculated from Equations 16 and 17, the estimation module 44 calculates new endpoints 50A' and 50C' according to Equations 18 through 21:

$$x_{Q4}' = x_{P2} + (dirVec[1] * L4) \qquad \text{Eqn. 18}$$

$$y_{Q4}' = y_{P2} + (dirVec[2] * L4) \qquad \text{Eqn. 19}$$

$$x_{Q3}' = x_{P1} + (dirVec[1] * L4) \qquad \text{Eqn. 20}$$

$$y_{Q3}' = y_{P1} + (dirVec[2] * L4) \qquad \text{Eqn. 21}$$

where $x_{Q4}'$ represents an x-coordinate value for endpoint 50C', $y_{Q4}'$ represents a y-coordinate value for endpoint 50C', where $x_{Q3}'$ represents an x-coordinate value for endpoint 50A', and $y_{Q3}'$ represents a y-coordinate value for endpoint 50A'. The updated coordinates represent realigned coordinates such that the parking spot 50 is oriented in the same direction as parking spot 52, e.g., the endpoints 50A' and 50C' are parallel with endpoints 52A and 52C.

As with Equations 4 and 5, the estimation module 44 uses the rotation matrix to calculate Equations 16 and 17. In an example implementation, the value for θ can be set to 90° based on the configuration of the parking spots 50 and 52.

Figure 7A:
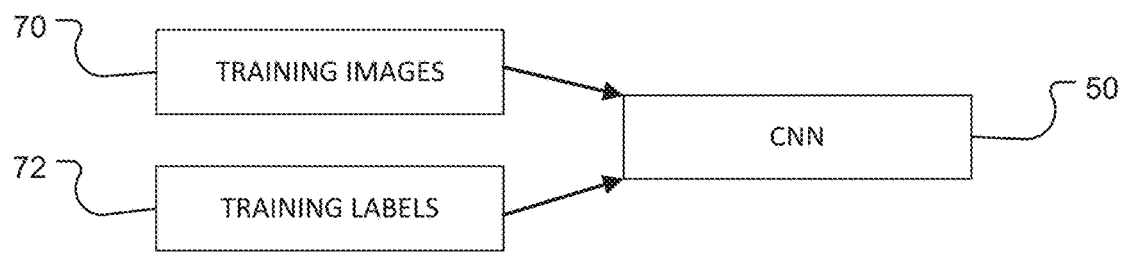
FIGS. 7A through 7C are block diagrams for training a convolutional neural network.
Figure 7B:
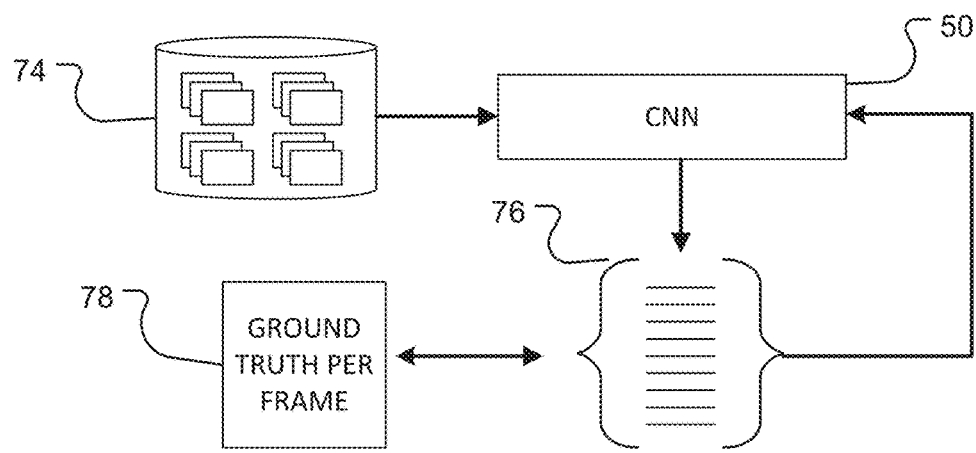

The CNN 50 may be trained via a supervised training process or a self-supervised training process. In an example implementation, FIGS. 7A and 7B illustrate an example process for training the CNN 50 in accordance with one or more implementations of the present disclosure. As shown in FIG. 10A; during an initial training phase, the CNN 50 receives a set of labeled training images (e.g., training images 70 and training labels 72). The training images 70 may depict objects within a stitched image. The training labels 72 may comprise object labels, object types, and/or labeled endpoints relative to one or more parking spot markings. After the initial training phase, at a supervised training phase, a set of training images 74 are input to the CNN 50. The CNN 50 generates outputs indicative of the endpoints for each of the training images 74.

FIG. 7B illustrates an example of generating output for one training image 74, such as a non-labeled training image, of the training images 74. Based on the initial training, the CNN 50 outputs a vector representation 76 of the parking spot endpoints. The vector representation 76 is compared to the around-truth data 78. The CNN 50 updates network parameters based on the comparison to the ground-truth 78. For example, the network parameters, e.g., weights associated with neurons of the CNN 50, may be updated via backpropagation.

Figure 7C:
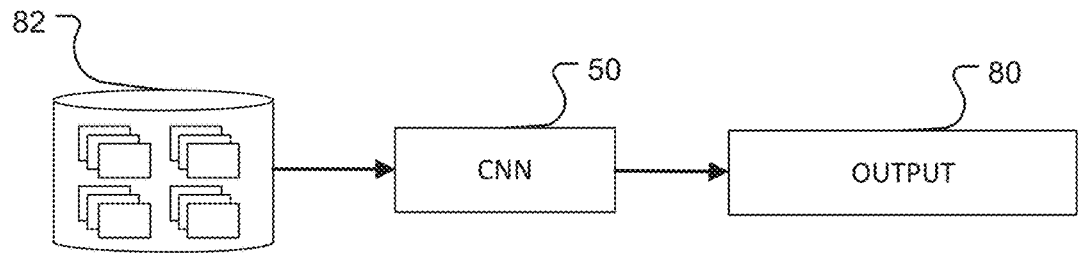

After training, the CNN 50 may be used to generate output 80 representing classified parking spot endpoints based on the received stitched images 82 as shown in FIG. 7C.

Figure 8:
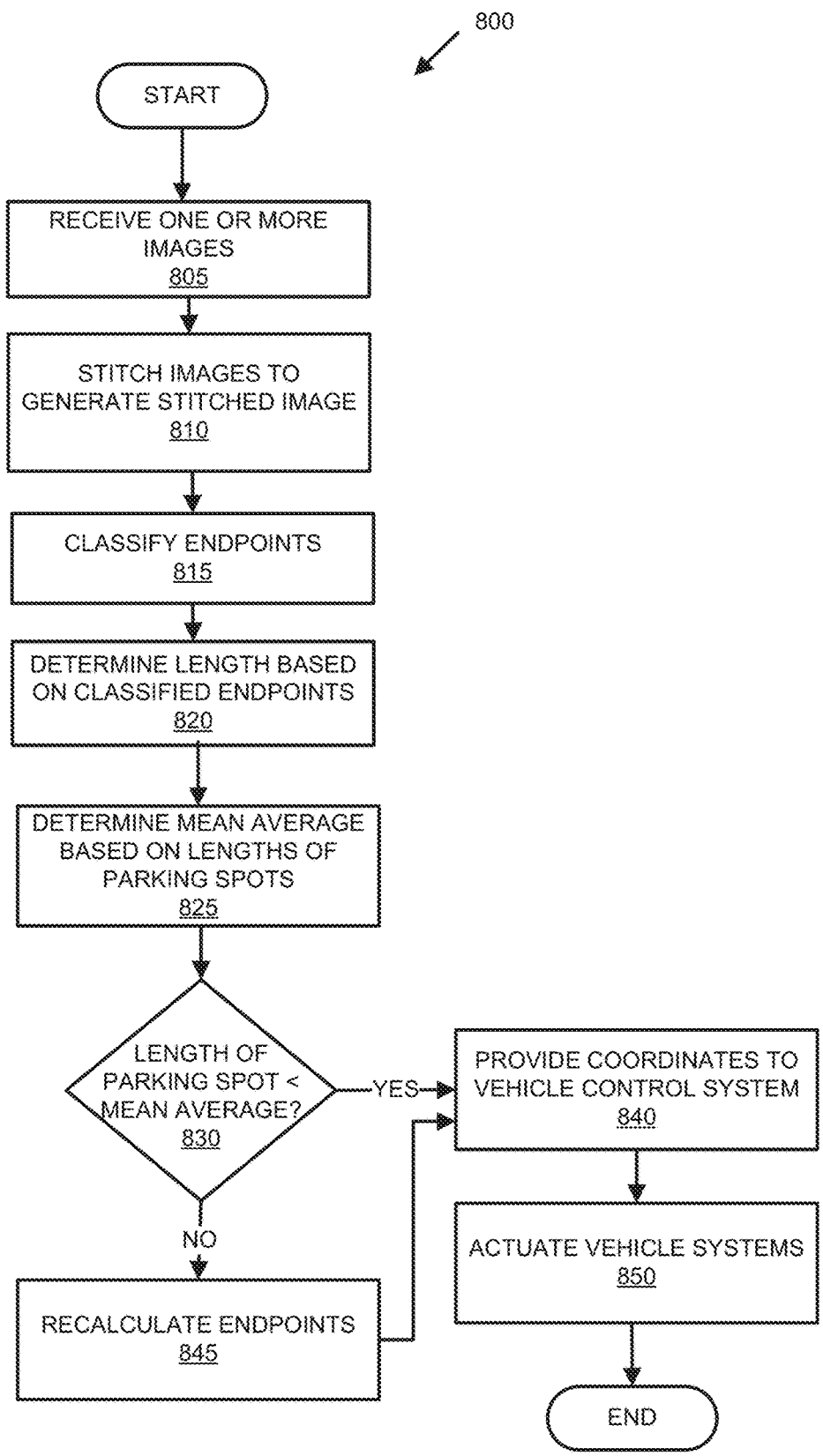
FIG. 8 is a flow chart depicting a process for autonomously parking the motor vehicle according to the principles of the present disclosure.

FIG. 8 is a flowchart of an exemplary process 800 for estimating values for a parking spot within a parking area, such as a parking area 30. Blocks of the process 800 can be executed by the controller 20. The process 800 begins at block 805 in which one or more images depicting a portion of a parking area is received from one or more sensors, such as the sensors 24A through 24D. At block 810, the image stitching module 40 stitches the one or more images together. At block 815, the detection module 42 classifies endpoints of a parking spot using the stitched image. For example, the detection module 42 can use the CNN 50 to determine one or more endpoints of the parking spot.

At block 820, the estimation module 44 determines a length for the one or more parking spots based on the classified endpoints. At block 825, the estimation module 44 calculates a mean average based on the lengths. At block 830, the estimation module determines whether a length for a parking spot is less than the mean length. If the length is less than the mean length, the estimation module 44 provides the coordinates for a parking spot to the vehicle control system 22 at block 840.

If the length is not less than the mean length, the estimation module 44 calculates the endpoints for the parking spot at block 845. The estimation module 44 can provide the coordinates for the parking spot to the vehicle control system 22 at block 840. At block 850, the vehicle control system 22 can actuate the vehicle 12 using the coordinates. For example, the vehicle control system 22 can be actuated to cause the vehicle 12 to park into a parking spot based on the coordinates of the calculated endpoints. The process 800 then ends.

In general, the computing systems and/or devices described may employ any of a number of computer operating systems, including, but by no means limited to, versions and/or varieties of the OnStar® application, Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on board vehicle computer, a computer workstation, a server, a desktop, notebook, laptop, or handheld computer, or some other computing system and/or device.

Computers and computing devices generally include computer executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

Memory may include a computer readable medium (also referred to as a processor readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system comprising a computer including a processor and a memory, the memory including instructions such that the processor is programmed to:
   receive an image depicting a parking spot;
   determine a length of the depicted parking spot based on a classified endpoint of the parking spot;
   compare the determined length to an average length;
   determine an endpoint of the depicted parking spot when the determined length is less than the average length, wherein the determined endpoint is distal to the classified endpoint; and
   realign the determined endpoint with an endpoint of an adjacent parking spot such that the depicted parking spot is oriented with the adjacent parking spot regardless of whether parking spot markings of the depicted parking spot are aligned properly with the parking spot markings of the adjacent parking spot.

2. The system as recited in claim 1, wherein the processor is further programmed to actuate a vehicle system of a vehicle using the determined endpoint and the classified endpoint.

3. The system as recited in claim 1, wherein the processor is further programmed to classify the classified endpoint via a convolutional neural network.

4. The system as recited in claim 3, wherein the convolutional neural network comprises at least one of a single shot detector, a You-Only-Look-Once network, or a Fast-RCNN network.

5. The system as recited in claim 1, further comprising a sensor configured to capture images representative of a vehicle environment.

6. The system as recited in claim 5, wherein the sensor is configured to capture Red-Green-Blue (RGB) images.

7. The system as recited in claim 1, wherein the classified endpoint and the determined endpoint comprise an x-coordinate and a y-coordinate within the image.

8. The system as recited in claim 1, wherein the image comprises a stitched image.

9. The system as recited in claim 1, wherein the processor is further programmed to stitch the stitched image based on a plurality of Red-Green-Blue images received from a plurality of sensors.

10. A method comprising:
    receiving an image depicting a parking spot;
    determining a length of the depicted parking spot based on a classified endpoint of the parking spot;
    comparing the determined length to an average length;

determining an endpoint of the parking spot when the determined length is less than the average length, wherein the determined endpoint is distal to the classified endpoint; and realigning the determined endpoint with an endpoint of an adjacent parking spot such that the depicted parking spot is oriented with the adjacent parking spot regardless of whether parking spot markings of the depicted parking spot are aligned properly with the parking spot markings of the adjacent parking spot.

11. The method as recited in claim 10, further comprising: actuating a vehicle system of a vehicle using the determined endpoint and the classified endpoint.

12. The method as recited in claim 10, wherein the classified endpoint is classified via a convolutional neural network.

13. The method as recited in claim 12, wherein the convolutional neural network comprises at least one of a single shot detector, a You-Only-Look-Once network, or a Fast-RCNN network.

14. The method as recited in claim 10, wherein the image is captured by a sensor configured to capture images representative of a vehicle environment.

15. The method as recited in claim 14, wherein the sensor is configured to capture Red-Green-Blue (RGB) images.

16. The method as recited in claim 10, wherein the classified endpoint and the determined endpoint comprise an x-coordinate and a y-coordinate within the image.

17. The method as recited in claim 10, wherein the image comprises a stitched image.

18. The method as recited in claim 17, further comprising stitching the stitched image based on a plurality of Red-Green-Blue images captured by a plurality of sensors.

19. A system comprising a computer including a processor and a memory, the memory including instructions such that the processor is programmed to:

receive a stitched image depicting a parking spot, the stitched image based on a plurality of images captured by a plurality of sensors;

determine a length of the depicted parking spot based on a classified endpoint of the depicted parking spot;

compare the determined length to an average length;

determine an endpoint of the depicted parking spot when the determined length is less than the average length, wherein the determined endpoint is distal to the classified endpoint;

realign the determined endpoint with an endpoint of an adjacent parking spot such that the depicted parking spot is oriented with the adjacent parking spot regardless of whether parking spot markings of the depicted parking spot are aligned properly with the parking spot markings of the adjacent parking spot; and actuate a vehicle system of a vehicle using the determined endpoint and the classified endpoint.

20. The system of claim 19, wherein the classified endpoint is classified via a convolutional neural network.

* * * * *